May 10, 1927.

M. R. WOLFARD 1,627,947

THERMOSTATIC CONTROL FOR CARBURETORS

Filed Sept. 4, 1924

Inventor.
Merl R. Wolfard
by Heard Smith & Tennant
Attys.

May 10, 1927.
M. R. WOLFARD
1,627,947
THERMOSTATIC CONTROL FOR CARBURETORS
Filed Sept. 4, 1924   5 Sheets-Sheet 2
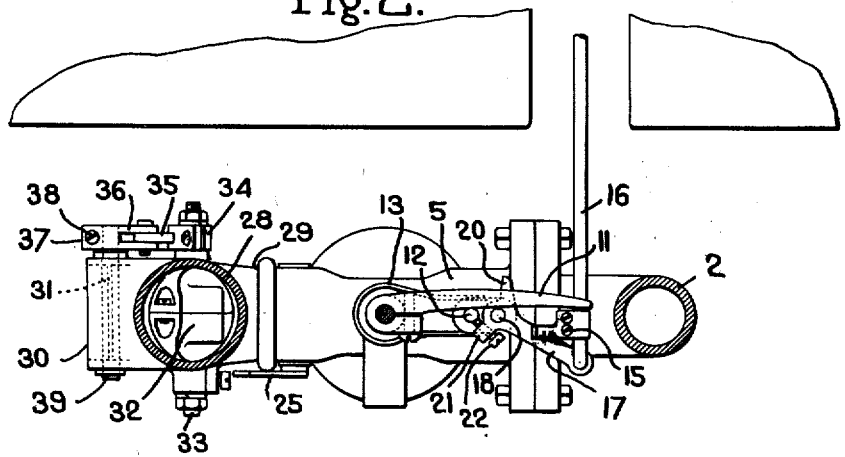
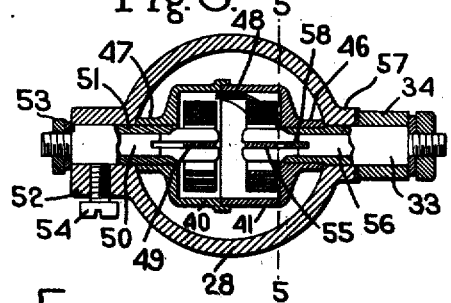
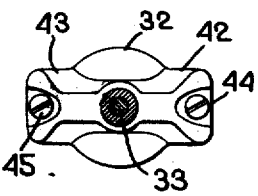
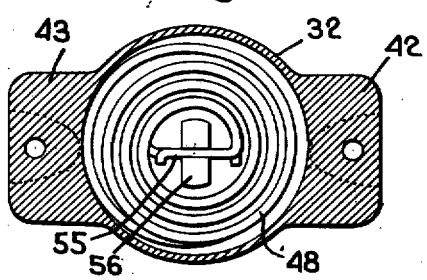
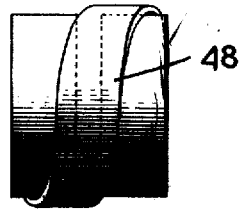
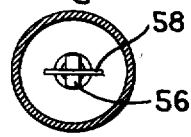
Inventor.
Merl R. Wolfard
by Heard Smith & Tennant.
Attys.

May 10, 1927. 1,627,947
M. R. WOLFARD
THERMOSTATIC CONTROL FOR CARBURETORS
Filed Sept. 4, 1924    5 Sheets-Sheet 3

Inventor.
Merl R. Wolford
by Heard Smith & Tennant
Attys.

May 10, 1927. 1,627,947
M. R. WOLFARD
THERMOSTATIC CONTROL FOR CARBURETORS
Filed Sept. 4, 1924  5 Sheets-Sheet 4

Inventor.
Merl R. Wolfard
by Heard Smith & Tennant.
Attys.

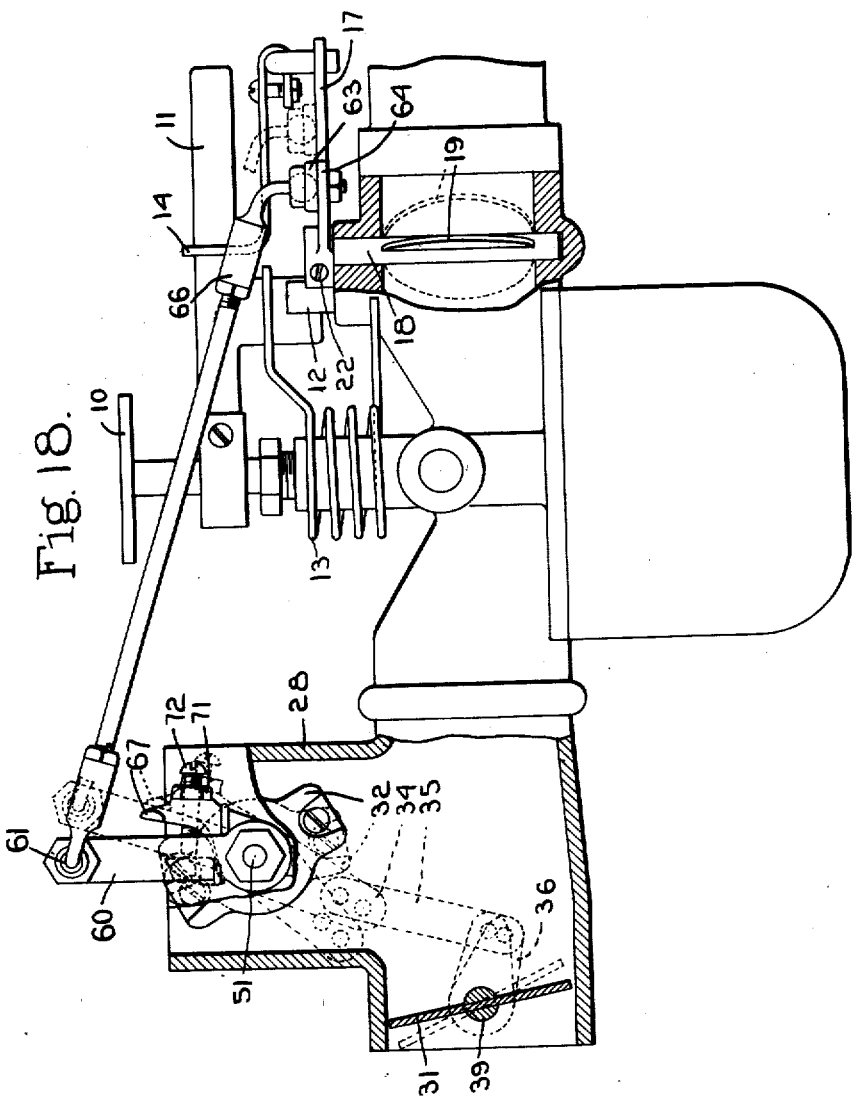

Patented May 10, 1927.

1,627,947

UNITED STATES PATENT OFFICE.

MERL R. WOLFARD, OF CAMBRIDGE, MASSACHUSETTS, ASSIGNOR TO HOPEWELL BROTHERS, OF WATERTOWN, MASSACHUSETTS, A COPARTNERSHIP COMPOSED OF CHARLES F. HOPEWELL AND HELEN C. HOPEWELL.

THERMOSTATIC CONTROL FOR CARBURETORS.

Application filed September 4, 1924. Serial No. 735,946.

This invention relates generally to improvements in means for controlling the quality, quantity and character of the explosive mixture supplied to an internal combustion engine.

One of the objects of the invention is to provide an improved means for controlling the proportions of the fuel and air mixture supplied to the cylinder or cylinders of an internal combustion engine.

Another object of the invention is to provide means for also controlling the thermal condition of the air supplied to the carburetor of an internal combustion engine.

In the present disclosure and in the claims the word "carburetor" is used in a broad sense to define any mechanism or device by which the fuel is supplied directly or indirectly to the intake of an internal combustion engine in such a manner that the fuel is mixed with or vaporized by air supplied to such intake either by the suction of the engine or by the introduction into said intake of air under pressure.

More specifically the invention relates to means by which the mixture proportions of air and fuel may be regulated by a thermostatic device to produce the best performance of the engine during the warming up period, during the operation of the engine under normal running conditions, and during the operation of the engine under heavy load, regardless of seasonal changes in temperature.

It is not a simple matter to control the mixture of fuel and air and the thermal conditions of the same in such a manner as best to fulfill all conditions inasmuch as it is desirable to operate the engine while running at a light or normal load with the most economical mixture, which is a relatively lean mixture; and to provide a richer mixture than is necessary for most economical operation when heavy loads are imposed upon the engine. Furthermore when usual commercial grades of gasoline, now available, are employed it is necessary during cold starting to enrich the mixture much more in proportion than is indicated by the increased density of the air caused by the temperature at which the engine is started, due to the fact that as the temperature drops lower and lower the percentage of gasoline vaporized is reduced more rapidly than the relative temperature drop.

The present invention is designed not only with a view of so controlling the relative proportions of hot and cold air supplied or admitted to the intake or carburetor of the engine as automatically to supply a proper economical explosive mixture to the engine during normal running conditions but also to provide in conjunction therewith manually-controlled means for supplying an additional amount of fuel to the engine when running under heavy loads.

A further object of the invention is to provide a thermostatically-operative choke valve in an inlet leading from a hot air supply, which is influenced by the temperature of the engine, to the carburetor which will automatically produce a rich mixture under cold starting conditions and will gradually produce a leaner mixture as the temperature of the engine increases to normal running condition.

A further object of the invention is to provide both a hot and cold air supply with thermostatically operated valves so connected and arranged that during the period of cold starting the supply of hot air will be choked and the admission of cold air prevented, thereby to cause a rich mixture to be supplied to the engine immediately after starting and operating during the heating up of the engine to gradually increase the amount of hot air supplied so as to produce a leaner mixture, and, as the temperature of the engine increases still further to admit a relatively increasing amount of cold air until a predetermined temperature is reached and thereafter to decrease the amount of hot air and to increase the amount of cold air.

A further object of the invention is to provide a carburetor or supply conduit for an internal combustion engine having a hot air inlet and a cold air inlet provided respectively with a thermostatically operated choke valve and a cold air valve so constructed that the thermostat will be subject not only to the influence of the hot air which passes through the hot air inlet, but also to that of the cold air entering the supply conduit and to that of the surrounding air whereby the temperature of the air acting upon the fuel will be less than the temperature of the hot air which acts upon the thermostatic device.

A further object of the invention is to provide a thermostatically-controlled choke valve in which the thermostatic device is enclosed within a casing and thus protected from dust, grit or other material which would interfere with its free operation.

A further object of the invention is to provide a novel thermostatically-controlled choke valve, preferably of the butterfly type, in which the thermostatic element comprises a thermo-sensitive member wound in a coil, preferably a double spiral, one end of which is fixedly and desirably adjustably mounted and the other end of which is connected to the valve.

A further object of the invention is to provide a thermostatically controlled choke valve, preferably of the butterfly type, for the hot air inlet, so constructed as to reduce very materially the angular motion necessary to produce a choking action upon rotation of the valve in either direction from open position also having such modified contour as to change the relative amount of choking action produced by a given angular movement as the valve is moved from open position toward a closed position.

A further object of the invention is to provide a mechanism operable automatically to regulate the relative proportions of hot and cold air during normal running conditions of the engine together with means operable by the movement of a valve in the intake affecting the flow of air therethrough, to vary the amount of fuel supplied so as to produce the most economical operation and conjointly therewith to vary the action of said thermostatic-controlling device so that when the engine is running under a heavy load a more powerful mixture will be supplied to the engine.

Other objects and features of the invention will more fully appear from the following description and the accompanying drawings and will be particularly pointed out in the claims.

A preferred embodiment of the invention is disclosed in Figs. 1 to 12 as applied to an automobile engine of the Ford type, and in Fig. 13 as adapted to a constant pressure type of carburetor such as a Stewart carburetor, and as disclosed in Fig. 14, as adapted to the hot and cold air supply to another type of engine such as the Chevrolet.

In the drawings:

Fig. 2 is a plan view, partly in horizontal section of the mechanism illustrated in Fig. 1;

Fig. 3 is a view mainly in longitudinal section through the choke valve and the thermostatic device by which it is controlled;

Fig. 4 is an end elevation of the preferred form of thermostatically operable choke valve illustrated in Fig. 3;

Fig. 5 is a vertical sectional view on lines 5—5 Fig. 3 viewed from the right toward the left;

Fig. 6 is an elevation of a spiral coil of a strip of bi-metallic thermostatic metal forming part of the present invention;

Fig. 7 is a sectional view of the thermostatic valve on lines 5—5, Fig. 3 viewed from the left toward the right;

Fig. 18 is a view, similar to Fig. 8, partly in section, illustrating in full lines the relative positions of the throttle valve, the thermostatically controlled choke valve and the cold air valve when the throttle valve is in closed or idling position, and illustrating in dotted lines the relative positions of these valves during an opening movement of the throttle valve.

Figure 1:
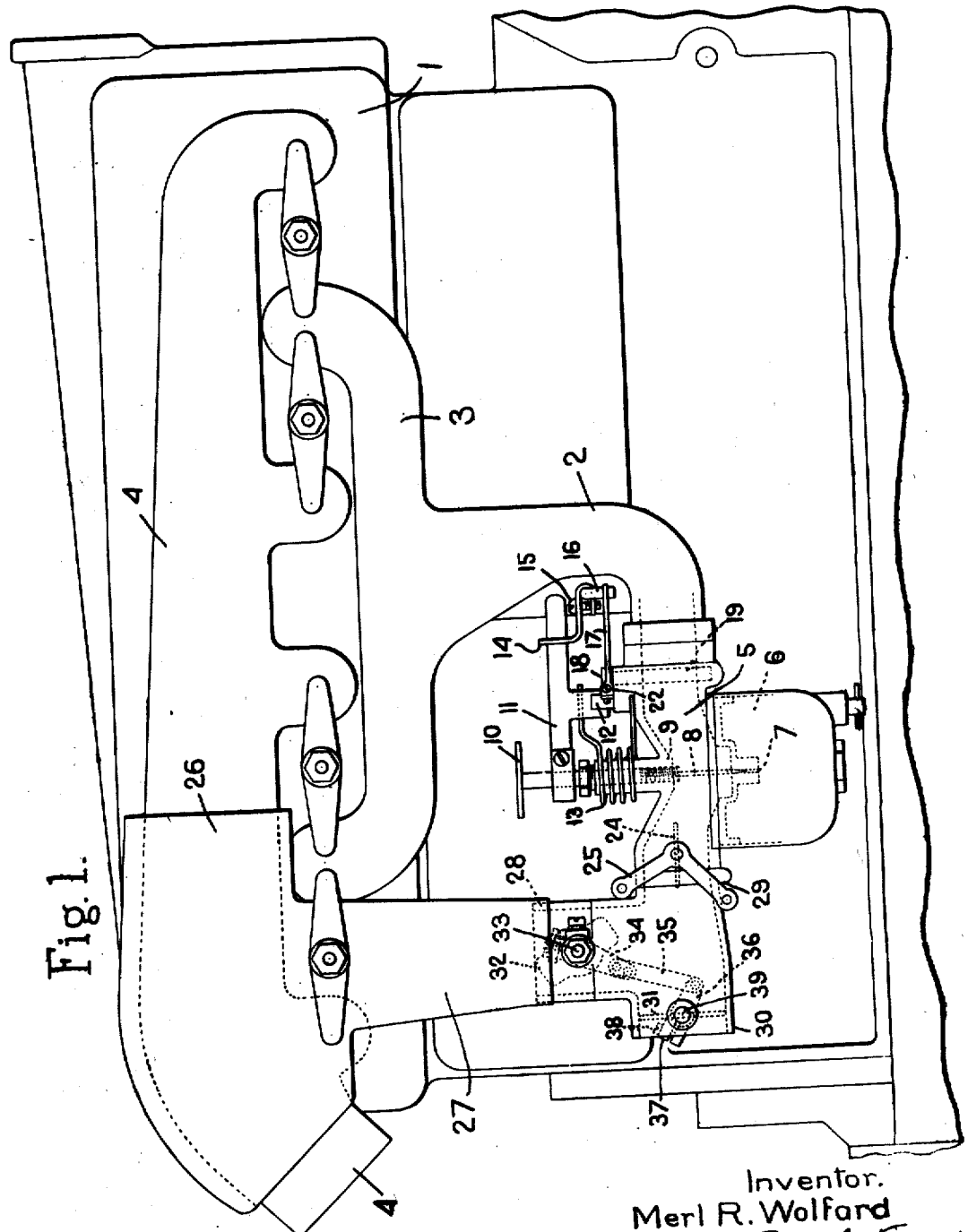
Fig. 1 is a side elevation of an automobile engine of the Ford type with the usual carburetor with means for supplying hot and cold air to said carburetor and illustrating the present invention applied thereto.

A preferred embodiment of the invention is disclosed herein as applied to an internal combustion engine of the Ford type which is diagrammatically illustrated and comprises a plurality of cylinders 1 to which explosive mixture is supplied through an intake conduit 2 and manifold 3 and from which cylinders the products of combustion are discharged through an exhaust manifold 4. Any suitable means may be provided for supplying fuel to the intake in such a manner that it may be vaporized and suitably mixed with air before entering the cylinders.

In the illustrated embodiment of the invention a carburetor of the usual type having a horizontal conduit 5 is secured to the flanged end of the intake 2. The carburetor has the usual liquid-containing chamber or float chamber 6 for the fuel provided with a port 7 communicating with the conduit 5 which port 7 is controlled by a needle valve 8 having a screw-threaded portion engaging complemental screw threads in a boss 9 extending downwardly from the upper wall of the conduit. The needle valve 8 desirably is provided with the usual head 10 by which it may be manually adjusted.

In the present construction the needle valve is also adapted to be operated by the movement of the throttle lever and for this purpose has secured to it a lever 11 which is provided with a reversely turned end portion which is clamped to the stem of the needle valve 8 by a screw. The lever 11 is normally held against a suitable stop 12 by a helical spring 13. The end of the lever 11 extends into the path of an arm 14 having a looped end portion which is clamped by a screw 15 to the link 16 by which the throttle lever 17 is operated. The throttle lever 17 is connected to the shaft 18 of a throttle valve 19 of the usual butterfly type which is located in the conduit 5 in close proximity to the flange by which the carburetor is secured to the intake 2.

The throttle lever 17 is provided with laterally extending arms 20 and 21 adapted to limit the movement of the throttle lever and the arm 21 is also provided with a set screw 22 which may be so adjusted as to engage the stop 12 or to limit the closing movement of the throttle. The arm 14 is connected to the manually operated throttle controlling rod 16 preferably at such a position as to engage the lever 11, which is connected to the stem of the needle valve, approximately when the throttle passes the position which permits substantially one-half of the maximum flow of mixture to pass through the intake to the engine.

The carburetor may also be provided with the usual choke valve 24 operable through a lever 25 and suitable connections therefrom to the instrument board of the automobile.

The present invention provides for selectively supplying hot or cold air or a regulated mixture of hot and cold air to the carburetor for the purpose of vaporizing the fuel and providing a suitable mixture for the running condition of the engine, the amount of hot and cold air supplied being regulated in such a manner that a suitable amount of a proper mixture will be supplied to the engine under the different starting and running conditions of the engine including light, normal and heavy loads.

Hot air is supplied to the carburetor from a "hot stove" which consists of an open ended sheet metal jacket 26 which partly or wholly surrounds a portion of the exhaust conduit and is provided with a downwardly extending tubular passage 27 which communicates with the central member 28 of a T-shaped conduit, one end 29 of the T of which is preferably telescopically connected to the conduit 5 of the carburetor and the other end 30 of which is open and forms the cold air inlet.

The cold air inlet end of the T-shaped conduit is provided with a valve 31. The hot air inlet is provided with a choke valve 32 preferably of the butterfly type which is controlled by a thermostatic device influenced by the heat from the engine. The shaft 33 of the choke valve is connected to an arm 34 which in turn is connected by a link 35 to an arm 36 having a bifurcated end 37 which is adjustably secured by a screw 38 upon the shaft 39 of the cold air valve 31.

The choke valve 32 is initially positioned, when the engine is cold, to throttle or choke the hot air inlet and the cold air valve is initially positioned, when the engine is cold, to prevent admission of air through the cold air inlet. The levers 34 and 36 and link 35 desirably are so proportioned and positioned that the cold air valve will remain closed or substantially closed while the choke valve is rotated a considerable distance by the thermostatic device as the heat from the engine increases. But upon further rotation of the choke valve by additional increase in temperature of the engine the cold air valve will be opened with increasing rapidity as the choke valve approaches and passes over full open position. Upon further increase in temperature of the engine the choke valve will be further rotated to cause a choking action of the hot air inlet while the cold air valve will be further opened during this choking movement.

By reason of the fact that the cold air inlet is closed and the hot air inlet choked when the engine is started a rich mixture is supplied to the engine which facilitates the starting and warming up of the engine. As the heat of the engine increases the choke valve is rotated gradually to admit more and more hot air during the warming up period which leans down the mixture. As the engine begins to approach normal running heat the choke valve approaches wide open position and gradually but increasingly opens the cold air valve in such a manner as to cause air at a proper temperature to be delivered to the carburetor and to the cylinders.

As the engine becomes further heated up the choke valve is rotated beyond wide open position and acts gradually to choke the intake of hot air as the temperature rises, and simultaneously to open the cold air valve. Consequently the temperature of the air admitted to the carburetor and to the engine cylinders is prevented from being heated abnormally or in other words the air admitted to the cylinders is maintained at a proper temperature which will insure a high volumetric efficiency.

By virtue of the construction and operation of the mechanism above described it will be obvious that the invention is adapted to supply automatically to the intake of an internal combustion engine the best possible combustible mixture under all running conditions of the engine regardless of the temperature of the atmosphere surrounding the engine.

The thermostatic device which controls the choke valve and the hot air valve may be of any suitable character and may be located in any suitable place in which it will be properly influenced by the heat from the engine. Desirably, however, it is located within the hot air inlet 28 in such position that it is subject not only to the hot air flowing through said inlet from the hot stove but also in part to the influence of the cold air which enters through the cold air conduit and to the temperature of the surrounding air—thus overheating of the thermostatic device is prevented.

The invention further includes the provision of a novel form of choke valve in which the angular movement necessary to produce a choking action upon rotation in either direction from wide open position is greatly reduced.

A preferred form of choke valve of this type which is illustrated in the accompanying drawings in Figs. 3, 4, 5, 6, 7, 15 and 16 comprises a two-part casing having complementary cylindrical central portions 40, 41, the adjacent ends of which desirably are telescopically arranged as illustrated in Fig. 3. The cylindrical portions 40, 41 are provided with radially opposite extensions 42, 43 which form the extremities of a butterfly valve and the sections of these extremities are secured together by screws 44 and 45. The cylindrical portions 40, 41 preferably do not extend the full length of the valve but are narrower near the axis to present relatively narrow end portions 46—47 adjacent the wall of the casing to prevent sticking when dust or grit accumulates upon the casing, and also to permit passage of an increased amount of air by the valve when the valve is rotated toward open position over that which would be permitted to pass through the conduit if the cylindrical portion of the valve casing should extend completely to the inner wall of the conduit 28.

The thermostatic device preferably is located within the chamber of the choke valve thus formed and desirably is formed of a bi-metallic strip wound into spiral form, one end of the spiral being rigidly and preferably adjustably anchored and the other end thereof connected to the valve.

One of the features of the present invention consists in providing a thermostatic device comprising a double spiral coil 48 preferably of bi-metallic thermo metal having both of its ends wound inwardly as illustrated in Fig. 6. One end 49 of one of the coils is placed in a slot in the head of a clamping rod 50 which passes axially through a hollow shaft 51 upon which the end of the butterfly valve is rotatably mounted. The head of the clamping rod is flattened on opposite sides parallel to its axis and is provided with a tapering shoulder which engages a complementary tapered surface in the adjacent end of the hollow shaft. The slot in the head is perpendicular to the flattened faces of the head and extends into the rod beyond the shoulder of said head.

The other end of the rod 50 is screw threaded and is provided with a lock washer. When, therefore, the nut 53 is set up the rod 50 will be moved axially and the tapered shoulder of the head of the rod will be drawn tightly against the complementary taper in the end of the hollow shaft 51 and the sections of the head will thereby be caused to clamp tightly upon the end of the thermostatic coil. The rod and the shaft will also be clamped together. One end of the hollow shaft 51 passes through a boss 52 extending radially from the wall of the inlet conduit 28 and is secured against rotation by a set screw 54 which passes through the boss 52 and engages the shaft, thus the end 49 of the thermostatic coil is anchored against rotation.

The opposite end 55 of the coil is similarly clamped in a slot in the flattened head of a rod 56 which passes axially through the hollow shaft 33 to which the lever 34, which is connected to the cold air valve is secured. The hollow shaft 33 is rotatably mounted in a boss 57 projecting from the wall of the hot air inlet in axial alignment with the boss 52. The hollow shaft 33 is slotted at its end and receives a positioning key 58 which extends also into a slot in the end portion 46 of the choke valve. The rod 56 is provided with a nut which when set up draws in the rod axially and not only clamps the head upon the end of the spiral coil as described but also expands the slotted end of the hollow shaft so as to clamp it into the end 46 of the valve. It also forms, when assembled, a rigid part of the shaft 33 of the choke valve.

By reason of this construction, therefore, it will be obvious that inasmuch as one end, 49, of the thermostatic coil is rigidly anchored and the other end, 55, is secured to the shaft 33 and the end 46 of the section 41 of the hollow casing of the valve, variations in temperature of the hot air which affect the thermostatic coil will cause a rotation of the choke valve. By the use of a continuous double spiral coil the ends of which are wound inwardly, a maximum stiffness for a given length and thickness of a strip of thermostatic metal is attained. Furthermore a sufficient length of thermostatic metal to give a proper amplitude of motion may be wound into such a small space that it can be readily encased in the choke valve.

The T-shaped hot and cold air inlet which leads to the carburetor with its thermostatically-operated valves, therefore, constitutes a device adapted to be attached to the usual type of carburetor of a Ford engine and others of similar character and operable to supply hot and cold air to a carburetor comprising a hot air inlet and a cold air inlet, a choke valve in the hot air inlet normally positioned to restrict the admission of hot air to the carburetor, a thermostatic device influenced by the temperature of the engine operable to control said choke valve, a valve in the cold air inlet initially positioned to prevent the admission of cold air with means connecting said choke valve and cold air valve operable during the starting of the engine to permit initial opening of the choke valve while the cold air valve remains closed and thereafter operating gradually to open the cold air valve with increasing rapidity relatively to the opening movement of the choke valve until a suitable temperature of the engine is attained and upon further increase in temperature to cause the choke valve gradually to produce a choking action while the cold air valve is further opened until it reaches wide open position.

Figure 9:
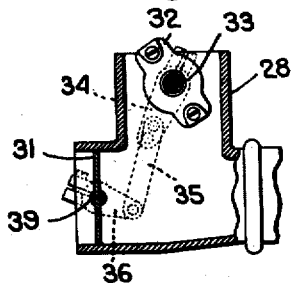
Fig. 9 is a vertical sectional view of the inlet for hot and cold air to the carburetor showing in elevation the choke valve in the hot air inlet and the valve in the cold air inlet in cold starting position.
Figure 10:
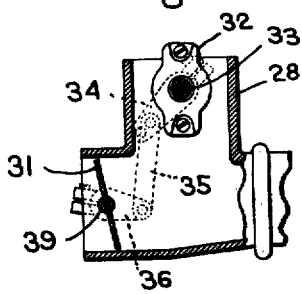
Fig. 10 is a similar view illustrating the relative positions of the hot and cold air valves after the heat from the engine has actuated the thermostatically-controlled valve sufficiently to admit a relatively small supply of cold air as for example during operation in cold weather.
Figure 11:
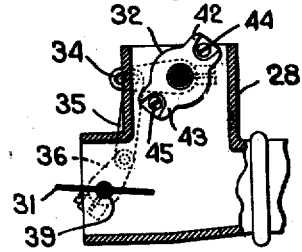
Fig. 11 is a similar view illustrating the positions of the choke valve and the cold air valve when the hot air inlet is in a highly heated condition and in which the thermostatically-controlled choke valve has restricted the supply of hot air while the cold air valve is in position to admit substantially a maximum amount of cold air, as for example during operation in hot weather.

The relative positions of the choke valve and cold air valve in starting position, cold weather operating position and in hot weather operating position are illustrated respectively in Figs. 9, 10 and 11.

The automatic thermostatic control of the choke valve and the cold air valve has been described independently of any throttle control. The present invention contemplates combining with the thermostatic control of the hot and cold air inlets means operable by the movement of the throttle valve to enrich the mixture when the engine is running under a heavy load, under which condition the throttle valve is moved beyond half open position and the mixture increasingly enriched as the valve is moved toward wide open position. This is accomplished in the preferred embodiment of the invention disclosed herein by the actuation of the lever 11, which is connected to the fuel valve stem, by the movement of the throttle.

As heretofore described the arm 14, which is connected to the link 16 which controls the throttle lever is so positioned that it does not engage the lever 11 until it is desirable to begin increasing the richness of the mixture. When the arm 14 engages the lever 11 further movement of the throttle towards wide open position gradually opens the fuel valve 8 thus supplying an increased amount of liquid fuel. The admission of hot and cold air is correlated with the admission of fuel by the action of the thermostatic control in such a manner as to provide a powerful mixture when the engine is running under a heavy load while the thermostatic device is so set in correlation to the throttle valve as to produce a lean mixture during the operation of the engine under a normal load.

A further refinement of the invention consists in so connecting the throttle actuating lever with the thermostatic device that the position of the thermostatic device may be varied in correlation to the position of the throttle valve. In the preferred embodiment of the invention illustrated in Fig. 8 one end of the arm 60 is connected to the hollow shaft 51 of the thermostatically-controlled choke valve and the other end is connected by a universal joint 61 to a link 62, the opposite end of which is connected by a universal joint 63 to an arm 64 upon a throttle lever. The universal connections 61 and 63 desirably are in the form of L-shaped members having at one end balls seated in complementary sockets respectively upon the arms 60 and the throttle lever arm 64, the other ends of the L-shaped levers being in the form of internally screw-threaded sleeves 65, 66 which receive screw-threaded ends of the link 62. Thus the effective length of the link 62 may be adjusted. Further means for adjusting the relative position of the choke valve may be provided by suitable connections permitting the radial length of the arm 60 to be varied. By reason of this construction such correlation is produced between the movements of the throttle valve and the valves for admitting hot and cold air respectively to the carburetor that the temperature of the air supplied to the carburetor is changed as the position of the throttle is varied and the richness of the mixture supplied to the engine may also be varied under certain conditions. This is accomplished because of the movement of the choke valve caused by the movement of the throttle valve in certain positions produces a choking action while its movement in other positions but slightly varies the choking action while changing materially the relative amounts of hot and cold air admitted to the carburetor and consequently changing the temperature of the air supplied to the engine. It should be noted that the change in temperature mentioned above may increase the richness of the mixture as the temperature rises.

The connection of the choke valve to the thermostatic valve is such as to supply colder air near wide open throttle position than is supplied during other throttle positions. This permits a supply of mixture to the engine of greater density and consequently of higher volumetric efficiency which increases the maximum power of the engine. In this construction the supply of fuel is also controlled from the throttle valve mechanism as heretofore described but inasmuch as the temperature of the charge is reduced the amount of the increase in fuel which should take place as throttle valve nears wide open position must also be increased. This is accomplished by lengthening the arm 14 so that it engages the lever 11 at a point nearer the needle valve than in the construction illustrated in Figs. 1 and 2 in which the thermostatically controlled hot and cold air valves are initially set.

In order to prevent too greatly changing the mixture as the throttle approaches closed position the arm 60 is so mounted upon the shaft 51 that the rotary movement of the choke valve may be limited when the throttle valve is nearing closed position.

Figure 8:
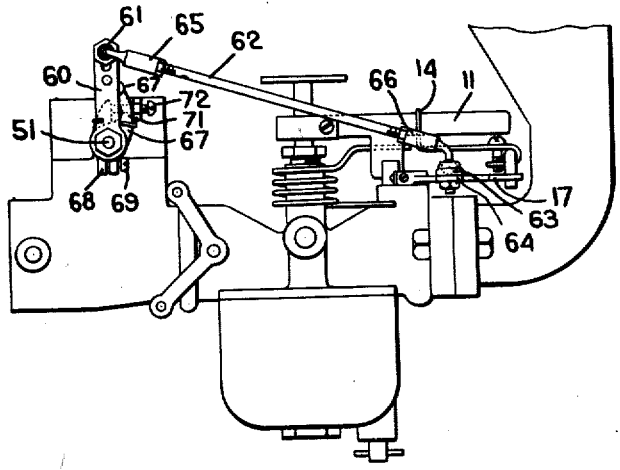
Fig. 8 is a side elevation of a portion of the intake manifold of the engine illustrated in Fig. 1, the carburetor, the means for controlling the relative amount of hot and cold air supplied thereto, and means operable by the throttle lever for co-ordinating the relative proportions of fuel and hot and cold air supplied to the carburetor.
Figure 12:
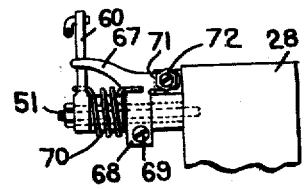
Fig. 12 is a detail view illustrating the mechanism for controlling the position of the choke valve when actuated from the throttle lever.

In the embodiment of the invention as illustrated in Figs. 8, 12, and 18 the arm 60 is rotatably mounted upon the end portion of the hollow shaft 51 which is extended through the casing. The arm 60 is engaged by an arm 67 of a split collar 68 which is clamped upon the shaft 51 by a set screw 69. A helical spring 70 coiled upon the hub of the arm 60 (see Fig. 12), which is rotatably mounted upon the shaft 51, with its ends engaging respectively the arm 60 and the arm 67 serves to hold the arm 60 against the arm 67. The collar 68 is provided with a laterally extending arm 71 having a set screw 72, the end of which is adapted to engage a suitable stud or boss upon the inlet conduit 28 which will limit the movement of the arm 67 and thereby prevent such rotation of the shaft as would cause an excessive rotative movement of the choke valve, while further movement of the arm 60 is permitted by the yielding of the spring 70.

The operation of the device is illustrated more fully in Fig. 18 which shows the walls of the air conduit broken away to expose the throttle valve, the thermostatically operated choke valve, and the cold air valve, these valves being illustrated in normal position when the throttle valve is closed and the engine in idling condition. Under this condition the choke valve is in partially open position and the cold air valve in closed position. When the throttle is moved toward open position the link 62 is moved toward the right swinging the arm 60 about its pivot. The arm 67 normally is positioned at such distance from the arm 60 that it will not be engaged during the initial movement of the throttle toward open position. Further movement, however, of the throttle toward open position causes the arm 60 to engage the arm 67 and thereby rotate the choke valve toward the position illustrated in dotted lines in Fig. 18. Any rotative movement of the choke valve in the direction indicated causes the rotation of the cold air valve toward open position whether such movement is produced by the rotation of the choke valve through the movement of the arms 60 and 67 or through the thermostatic action of the coil within the choke valve. Thus colder air is supplied to the engine near wide open position than is supplied during other throttle positions causing the engine to be supplied with a mixture of greater density and consequently of higher volumetric efficiency thus increasing the maximum power of the engine. As heretofore described the supply of fuel is also controlled by the throttle valve mechanism which is operated through lever mechanism connected to the throttle.

Another feature of the invention consists in providing a choke valve of the butterfly type of a modified form having thick extremities as previously described and the contour of which is so modified as to effect materially the relative choking action produced by a given angular movement as the valve is moved toward choking position.

Figure 15:
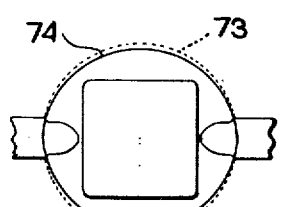
Fig. 15 is a plan view of a modified type of butterfly choke valve.

In Fig. 15 a plan view of a valve of the butterfly type having thickened edges is shown, the contour of the valve being so modified as to produce the desired action. In Fig. 15 the circle 73 in dotted lines illustrates the contour of the circular passage in which the valve is mounted while the solid line 74 illustrates the elliptical contour of the preferred form of choke valve in which the major axis of the ellipse coincides with the axis of the valve. The valve illustrated in Fig. 15 is diagrammatically shown in elevation in Fig. 16. The outer dotted line 75 illustrates the path of the extremity that the valve would follow if the valve were a true circle and the inner dotted line 76 illustrates the path of the extremity of the modified elliptical form of valve illustrated in plan view in Fig. 15.

It will be noted that the choking action of the contour of the valve indicated by the inner circle is greatly reduced for a given angular movement as the valve approaches throttling position over that which would be produced if the contour of the valve were circular so as to follow the outer dotted line. The radial lines including the sectors respectively indicated as "thermo angle" and "throttle angle" illustrate the utility of the modified form of butterfly valve when connected to the throttle mechanism as above described and shows clearly how the angular position of the choke valve may be appreciably increased by the action of the throttle without very materially increasing the choking action.

Figure 16:
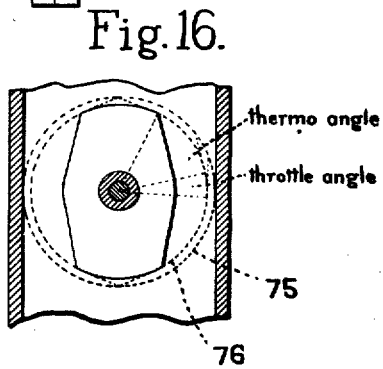
Fig. 16 is an end view illustrating the thermostatically-controlled choke valve shown in Fig. 15 and illustrating diagrammatically the relative positions of the thermo and throttle angles through which the valve is rotated respectively by the thermostatic and throttle control, and also the modification in throttling effect produced by the modified contour of the butterfly valve.
Figure 17:
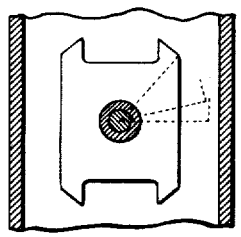
Fig. 17 is a similar view of an alternative form of choke valve which may be used in place of the valve shown in Fig. 16.

In Fig. 17 a different form of modified type of throttle valve is shown in elevation, the action of which is similar to that illustrated in Fig. 16.

Figure 14:
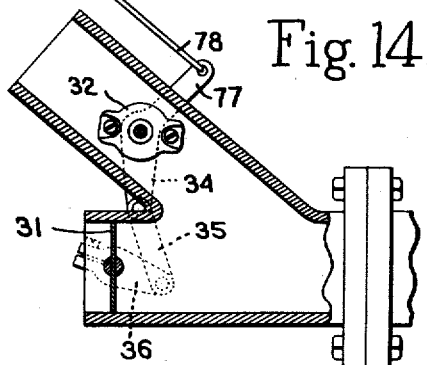
Fig. 14 is a detail view mainly in vertical section of the invention as applied to a different type of inlet to a carburetor.

In Fig. 14 the invention is illustrated as applied to a different type of inlet having a flanged inlet conduit to the carburetor and in which the hot and cold air passages are arranged at an acute angle to each other. In this construction the same type of thermostatically controlled choke valve and cold air valve are employed as are illustrated in Figs. 9, 10 and 11. The arm 77, being an extension of the lever 34 and connected to a link 78, extends to the instrument board of the automobile. In this construction, therefore, the lever 77 may be operated manually through the link 78 in such a manner that the automatically operable choke valve can be manually positioned to produce a further choking action during the starting of the engine after which the arm 77 may be permitted to return to its normal position. In this construction the spirally coiled thermostat serves as a spring to return the valve to normal position.

Figure 13:
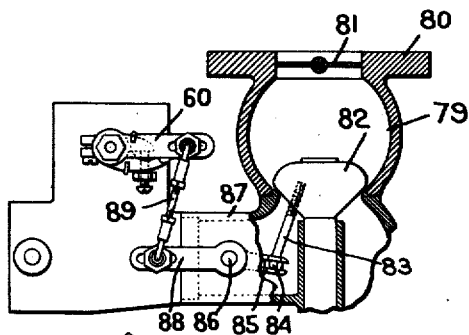
Fig. 13 is a view partly in vertical section of the invention as applied to a carburetor having a constant pressure valve.

In Fig. 13 the invention is illustrated as applied to a constant pressure type of carburetor which as illustrated comprises a spheroidal casing 79 having a flange 80 by which it is secured to the intake of the engine with the usual throttle valve 81 in the outlet passage. In this construction the constant pressure valve 82 has connected to it a downwardly and laterally extending stud 83 provided with a laterally extending pin 84 which is engaged by the forked end of a lever 85 which is secured to a shaft 86 which is rotatably mounted in the walls of the inlet conduit 87.

An arm 88 which is mounted upon the end of the shaft 86, which projects through the casing of the inlet conduit 87 is connected by a link 89 to the arm 60 which serves to position the choke valve. In this construction the link 89 is provided at either end with universal joints of the type heretofore described. In this construction the upward movement of the constant pressure valve permits the admission of more and more air and at the same time reduces the choking action of the choke valve.

In this construction the choke valve is connected to the cold air valve in the manner heretofore described with reference to Figs. 9, 10 and 11.

It will be obvious from the foregoing disclosure that the invention is adapted to be embodied in various types of construction for supplying a combustible mixture of fuel and air to an internal combustion engine.

When the thermostatically controlled choke valve operatively connected to the cold air valve alone is employed the device functions to provide a proper mixture to be supplied during the warming up period and to supply a suitable mixture at a proper temperature during the operation of the engine under all atmospheric temperatures.

When the throttle control is used in conjunction with the needle valve as described the further advantage is obtained of being able to operate at the most economical mixture during normal loads and to supply the most powerful mixture during operation under heavy torques at whatever speed the engine may be operating, thus enabling the engine to operate most satisfactorily under all hill climbing conditions.

When the thermostatically controlled choke valve is connected to the throttle mechanism (as in Fig. 8) higher temperatures may be employed during operation at normal load which will give increased acceleration to the engine while still using the most economical mixture, and the temperature of the mixture may be reduced near wide open throttle so as to supply to the engine a dense and powerful mixture under heavy torque conditions.

When the thermostatically controlled choke valve operatively connected to the cold air valve is employed in conjunction with the constant pressure valve as shown in Fig. 13 the same advantages noted in the previous paragraphs are obtained except that the dense and powerful mixture is available under heavy load conditions as contrasted with heavy torque conditions. For example, an automobile may be running under heavy torque up a hill at ten miles an hour, but the load on the engine might not be more than one third or one quarter of what it would be when propelling the car at forty or fifty miles per hour.

It will be understood that the embodiment of the invention disclosed herein is illustrative and not restrictive and that various changes in form, construction, arrangement and operation may be made within the spirit and scope of the following claims.

Having thus described my invention, what I claim as new, and desire to secure by Letters Patent, is:

1. In combination with an internal combustion engine having an intake conduit and means for supplying a liquid fuel thereto, means for supplying hot air to said conduit, means for admitting cold air to said conduit, controlling means initially positioned respectively to prevent admission of cold air and to admit a restricted amount of hot air from said hot air supply to said conduit, thermostatic means influenced by the heat from the engine operable upon increase of the temperature thereof to cause said controlling means to admit an increasing supply of hot air to said conduit until a predetermined temperature of the engine is attained, and simultaneous therewith to admit to said conduit an initially less but more rapidly increasing amount of cold air.

2. In combination with an internal combustion engine having an intake conduit and means for supplying a liquid thereto, means for supplying hot air to said conduit, means for admitting cold air to said conduit, controlling means initially positioned respectively to prevent admission of cold air and to admit a restricted amount of hot air from said hot air supply to said conduit, thermostatic means influenced by heat from the engine operable upon increase of the temperature of the engine to cause said controlling means to admit an increasing supply of hot air to said conduit until a predetermined temperature of the engine is attained, and simultaneous therewith to admit to said conduit an initially less but more rapidly increasing amount of cold air, and also operable upon increase of the temperature of the engine beyond the said predetermined temperature gradually to diminish the supply of hot air.

3. In combination with an internal combustion engine having an intake conduit and means for supplying a liquid fuel thereto, a hot air supply, a hot air inlet leading therefrom to said intake conduit, a choke valve in said hot air inlet, a thermostatic device influenced by heat from the engine for controlling said choke valve, a cold air inlet leading to said intake conduit, a valve in said cold air inlet, and means operable by said thermostatic device increasingly to vary the rate of movement of said cold air valve relatively to the rate of movement of said choke valve in response to an increase in the temperature of the engine.

4. In combination with an internal combustion engine having an intake conduit and means for supplying a liquid fuel thereto, a hot air supply, a hot air inlet leading therefrom to said intake conduit, a choke valve in said hot air inlet, a thermostatic device for controlling said choke valve, a cold air inlet leading to said intake conduit, a valve in said cold air inlet, means connecting said choke valve and said cold air valve operable during the movement of said choke valve when actuated by said thermostat by lower operative temperatures to cause said cold air valve to open slowly and when actuated by higher operative temperatures to cause said cold air valve to open with gradually increasing rapidity.

5. In combination with an internal combustion engine having an intake conduit and means for supplying liquid fuel thereto, a hot air supply, a hot air inlet leading therefrom to said conduit, a choke valve controlling said inlet, a thermostatic device positioned within said hot air inlet controlling said choke valve, a cold air inlet leading to said conduit, a cold air valve initially positioned to close said inlet, and means connecting said cold air valve to said choke valve and operable by the movement of said choke valve by said thermostat to vary the amount of cold air relatively to the amount of hot air admitted to said conduit.

6. In combination with an internal combustion engine having an intake conduit and means for supplying liquid fuel, thereto, a hot air supply, a hot air inlet leading therefrom to said conduit, a choke valve controlling said inlet, a thermostatic device positioned within said hot air inlet controlling said choke valve, a cold air inlet leading to said conduit, a cold air valve initially positioned to close said inlet, and means connecting said cold air valve to said choke valve and operable by the movement of said choke valve by said thermostat to impart to said cold air valve a slow opening movement with an increasing rate of movement relatively to that of the choke valve.

7. In combination with an internal combustion engine having an intake conduit and means for supplying a liquid fuel thereto, a hot air supply, a hot air inlet leading therefrom to said conduit, a choke valve controlling said inlet, a thermostatic device positioned within said hot air inlet controlling said choke valve, a cold air inlet leading to said conduit, a cold air valve initially positioned to close said inlet, and means connecting said cold air valve to said choke valve operable upon movement of said choke valve by said thermostat to impart to said cold air valve a slow opening movement with an increasing rate of movement relative to that of the choke valve, the rate of movement of said cold air valve being such as to lower the temperature in the supply conduit while the temperature of the air surrounding the thermostat continues to rise.

8. In combination with an internal combustion engine having an intake conduit and means for supplying a liquid fuel thereto, a hot air supply, a hot air inlet leading therefrom to said conduit, a choke valve controlling said inlet, a thermostatic device positioned within said hot air inlet controlling said choke valve, a cold air inlet leading to said conduit, a cold air valve initially positioned to close said inlet, and means connecting said cold air valve to said choke valve operable upon movement of said choke valve by said thermostat to impart to said cold air valve a slow opening movement with an increasing rate of movement relative to that of the choke valve, the rate of movement of said cold air valve being such as to cause the temperature of the air surrounding the thermostat to rise more rapidly than the temperature of the air in the supply conduit.

9. In combination with an internal combustion engine having an intake conduit and means for supplying a liquid fuel thereto, a hot air supply, a hot air inlet leading therefrom to said conduit, a choke valve controlling said inlet, a thermostatic device positioned within said hot air inlet controlling said choke valve, a cold air inlet leading to said conduit, a cold air valve initially positioned to close said inlet, and means connecting said cold air valve to said choke valve operable upon the movement of said choke valve by said thermostat to impart to said cold air valve a slow opening movement with an increasing rate of movement relative to that of the choke valve, the connection between said choke valve and cold air valve being such that during the travel of the choke valve caused by the thermostat when subjected to the lower operative temperature range said cold air valve will remain practically closed and during that part of the travel of the choke valve which is caused by the actuation of the thermostat when subjected to a higher range of temperature will cause said cold air valve to open rapidly.

10. In combination with an internal combustion engine having an intake conduit and means for supplying a liquid fuel thereto, a hot air supply influenced by the heat of the engine, a hot air inlet leading therefrom to said conduit, a choke valve in said inlet and thermostatic device influenced by the heat of the engine connected to the said choke valve and operable to cause said choke valve to produce a choking action as the lowest and highest operative temperatures to which said thermostatic device is subjected am approached.

11. In combination with an internal combustion engine having an intake conduit and means for supplying a liquid fuel thereto, a hot air supply influenced by the heat of the engine, a hot air inlet leading to said conduit, a choke valve of the butterfly type in said inlet, a thermostatic device influenced by the heat of the engine connected to said choke valve and operable thereby to cause said choke valve to produce a choking action as the lowest and highest operative temperatures to which said thermostatic device is subjected are approached.

12. In combination with an internal combustion engine having an intake conduit and means for supplying a liquid fuel thereto, a hot air supply influenced by the heat of the engine, a hot air inlet leading therefrom to said conduit, a choke valve within said inlet, a thermostatic device enclosed within said choke valve secured at one end and connected to said choke valve operable to cause said choke valve to produce a choking action as the lowest and highest operative temperatures to which said thermostatic device is subjected are approached.

13. In combination with an internal combustion engine having an intake conduit and means for supplying a liquid fuel thereto, a hot air supply influenced by the heat of the engine, a hot air inlet leading therefrom to said conduit, a chambered choke valve of the butterfly type in said inlet, a thermostatic device enclosed within the chamber of said choke valve secured at one end and connected to said choke valve and operable to cause said choke valve to produce a choking action as the lowest and highest operative temperatures to which said thermostatic device is subjected are approached.

14. In combination with an internal combustion engine having an intake conduit and means for supplying a liquid fuel thereto, a hot air supply influenced by the heat of the engine, a hot air inlet leading therefrom to said conduit, a chambered choke valve in said inlet, a spirally wound thermostat enclosed within said chamber of said choke valve secured at one end and connected to said choke valve and operable to cause said choke valve to produce a choking action as the lowest and highest operative temperatures to which said thermostatic device is subjected are approached.

15. In combination with an internal combustion engine having an intake conduit and means for supplying liquid fuel thereto, a cold air inlet, a hot air supply influenced by the heat of the engine, a hot air inlet leading therefrom to said conduit, a choke valve of the butterfly type positioned therein, a thermostatic device subject to the heat of the engine secured at one end and connected to said choke valve and operable to cause said choke valve to produce a choking action at the lowest and highest operative temperatures to which said thermostatic device is subjected, a cold air valve controlling said inlet and means connecting said cold air valve to said choke valve operable to cause a variable movement to said cold air valve relatively to that of the hot air valve.

16. In combination with an internal combustion engine having an intake conduit and means for supplying liquid fuel thereto, a cold air inlet, a hot air supply influenced by the heat of the engine, a hot air inlet leading therefrom to said conduit, a choke valve of the butterfly type positioned therein, a thermostatic device subject to the heat of the engine secured at one end and connected at its other end to said choke valve and operable to cause said choke valve to produce a choking action at the lowest and highest operative temperatures with which said thermostatic device is subjected, a cold air valve controlling said inlet and means connecting said cold air valve to said choke valve operable to cause a variable movement to said cold air valve relatively to that of the hot air valve, said means being constructed to hold said cold air valve practically closed when the choking action is produced by one position of the choke valve and to open said cold air valve rapidly as the choke valve is rotated toward the other choking position.

17. A device for supplying air to a carburetor comprising a hot air inlet and a cold air inlet, a choke valve in the said hot air inlet initially positioned to restrict the admission of hot air to said carburetor, a thermostatic device influenced by the temperature of the engine operable to control said choke valve, a valve in said cold air inlet initially positioned to prevent admission of cold air, and means connecting said choke valve and cold air valve operable by the movement of said choke valve under the action of the thermostatic device gradually to open said cold air valve with increasing rapidity relatively to the movement of said choke valve.

18. A device for supplying air to a carburetor comprising a hot air inlet and a cold air inlet, a choke valve in said hot air inlet, a valve in said cold air inlet, means for actuating said choke valve and means connecting said choke valve and said cold air valve operable during one part of the travel of said choke valve to permit the cold air valve to remain practically closed and during another part of the travel of said choke valve to open said cold air valve rapidly, whereby the temperature of the air entering the carburetor is prevented from being abnormally increased.

19. A device for supplying air to a carburetor comprising a hot air inlet and a cold air inlet, a choke valve in said hot air inlet, a valve in said cold air inlet, a thermostatic device positioned within said hot air inlet acting to control said choke valve, and means connecting said choke valve and said cold air valve as to cause a relative movement of said valves operable to lower the temperature of the air delivered to the carburetor while the temperature of the hot air surrounding the thermostatic device continues to rise.

20. A device for supplying air to a carburetor comprising a hot air inlet and a cold air inlet, a choke valve in said hot air inlet, a valve in said cold air inlet, a thermostatic device positioned within said hot air inlet controlling said choke valve operable to permit said cold air valve to remain practically closed during the movement of the choke valve caused by said thermostatic device when subjected to the lower operative temperature range and to cause said cold air valve to open rapidly during the movement of the choke valve caused by said thermostatic device when subjected to a higher range of temperature.

21. A device for supplying air to a carburetor comprising a hot air inlet and a cold air inlet, a choke valve in said hot air inlet initially positioned to restrict the admission of hot air to said carburetor, a thermostatic device located within said hot air inlet and acting to control said choke valve, a valve in said cold air inlet initially positioned to prevent admission of cold air, and means connecting said choke valve and cold air valve operable by the opening movement of said choke valve under the action of said thermostatic device gradually to open said cold air valve with increasing rapidity relatively to the movement of said choke valve.

22. A device for supplying air to a carburetor comprising a hot air inlet and a cold air inlet, a chambered valve in said hot air inlet initially positioned to restrict the admission of hot air to said carburetor, a thermostatic device enclosed within the chamber of said choke valve acting to control said choke valve, a valve in said cold air inlet initially positioned to prevent the admission of cold air and means connecting choke valve and said cold air valve operable by the opening movement of said choke valve under the action of thermostatic device gradually to open said cold air valve with increasing rapidity relatively to the movement of choke valve.

23. A device for supplying air to a carburetor comprising a hot air inlet conduit and cold air inlet conduit, a choke valve in said hot air inlet initially positioned to restrict admission of cold air, a thermostatic device in said hot air inlet operably connected to said valves to cause said valves to admit an increasing supply of hot air to said carburetor during the lower temperature range of said thermostatic device while maintaining said cold air valve substantially closed and operable during a higher operative temperature range of said thermostatic device to open said cold air valve gradually and simultaneously to restrict the admission of hot air.

24. A device for supplying air to a carburetor comprising a hot air inlet conduit, and a cold air inlet conduit, a choke valve of the butterfly type in said hot air inlet, a thermostatic device in said hot air inlet connected to said choke valve operable by variations in temperature above and below a predetermined temperature, to rotate said choke valve in opposite directions from wide open position and thereby to produce a choking action in said hot air inlet, a valve in said cold air inlet and means connecting said choke valve to said cold air valve operable gradually to open said cold air valve during the choking movement of the choke valve caused by increase in the temperature to which said thermostatic device is subjected above the temperature at which the choke valve is in wide open position.

25. A device for supplying air to a carburetor comprising an air inlet conduit, a butterfly valve within said conduit operable when rotated in either direction from open position to produce a choking action and having thick extremities whereby a relatively small angular motion of the valve is required to produce a choking action, and a thermostatic device operable to control the position of said valve.

26. A device for supplying air to a carburetor comprising an air inlet conduit, a butterfly valve within said conduit operable when rotated in either direction from open position to produce a choking action and having thick extremities and relatively thin edges at its axis ends and a thermostatic device operable to control the position of said valve.

27. A device for supplying air to a carburetor, comprising an air inlet conduit, a valve in said inlet of the butterfly type having relatively thick extremities, the contour of said valve being modified from a true circle by reducing its dimensions at right angles to the axis of the valve, and a thermostatic device operable to control the position of said valve.

28. A device for supplying air to a carburetor comprising an air inlet conduit, a valve in said inlet of the butterfly type having relatively thick extremities and an elliptical contour in which the major axis of the ellipse coincides with the axis of the valve, and a thermostatic device operable to control the position of said valve.

29. A device for supplying air to a carburetor comprising an air inlet conduit, a chambered butterfly valve within said inlet, having relatively thick extremities and an elliptical contour in which the major axis of the ellipse coincides with the axis of the valve, a thermostatic device comprising a spiral coil of bi-metallic thermo metal enclosed within said valve chamber and operable to control the position of said valve.

30. A device for supplying air to a carburetor comprising a hot air inlet conduit, a chambered butterfly valve within said inlet having relatively thick extremities and an elliptical contour in which the major axis of the ellipse coincides with the axis of the valve, a thermostatic device comprising a continuous double spiral coil enclosed within said valve chamber and having one end anchored and the other end connected to said valve and operable to control the position of said valve.

31. A device for supplying air to a carburetor comprising a hot air inlet conduit, a chambered butterfly valve within said inlet of elliptical contour in which the major axis of the ellipse coincides with the axis of the valve and having relatively thick extremities along the minor axis, a thermostatic device comprising a continuous double spiral coil enclosed within said valve chamber and having one end anchored and the other end connected to said valve and operable to control the position of said valve, a cold air inlet, a cold air valve initially closing said cold air inlet and means connecting said cold air valve with said butterfly valve operable gradually to open said cold air valve during the movement of the hot air valve caused by increase in the temperature to which the thermostatic device is subjected.

32. In combination with an internal combustion engine having an intake conduit, a valve in said conduit, means for supplying liquid fuel to said conduit, a valve controlling said fuel supply, a hot air inlet to said conduit, a cold air inlet to said conduit, means including a thermostatic device operable to control the relative proportions of hot and cold air admitted to said conduit and connections between the valve in said conduit, said fuel valve and the thermostatic device controlled by the movement of the valve in said conduit and conjointly operable with said thermostatic device automatically to regulate the supply of fuel and the relative proportions of hot and cold air admitted to said conduit.

33. In combination with an internal combustion engine having an intake conduit, a valve in said conduit, means for supplying liquid fuel to said conduit, a hot air inlet to said conduit, a choke valve in said inlet, a thermostatic device operable to control said choke valve, a cold air inlet to said conduit, a valve in said cold air inlet, means connecting said cold air valve to said choke valve, and means connecting said choke valve to the valve in said intake conduit operable to regulate the position of said choke valve relatively to the position of the valve in said intake conduit.

34. In combination with an internal combustion engine having an intake conduit, a throttle valve in said conduit, means for supplying a liquid fuel to said conduit, a valve controlling said fuel supply, a hot air inlet to said conduit, a choke valve in said hot air inlet, a cold air inlet to said conduit, a valve in said cold air inlet means including a thermostatic device operable to control said choke valve and said cold air valve, and means connecting said throttle valve to said fuel valve operable to increase the supply of fuel to said conduit after the throttle valve passes beyond half-open throttle position.

35. In combination with an internal combustion engine having an intake conduit, a throttle valve in said conduit, means for supplying a liquid fuel to said conduit, a valve controlling said fuel supply, a hot air inlet to said conduit, a choke valve in said hot air inlet, a cold air inlet to said conduit, a valve in said cold air inlet, means including a thermostatic device operable to control said choke valve and said cold air valve, means connecting said throttle valve to said fuel valve operable to increase the supply of fuel to said conduit after the throttle valve passes beyond half-open throttle position, and means operable by the movement of said throttle valve in co-ordination with the action of said thermostatic device to regulate the position of said choke valve.

36. In combination with an internal combustion engine having an intake conduit, a throttle valve in said conduit, means for supplying liquid fuel to said conduit, a valve for controlling said liquid fuel supply, a hot air supply influenced by the heat of the engine, a hot air inlet leading to said conduit, a choke valve in said hot air inlet, a cold air inlet to said conduit, a valve in said cold air inlet, means operatively connecting said cold air valve and said choke valve to permit the cold air valve to remain practically closed during the initial movement of said choke valve and to cause said cold air valve to open rapidly during another movement of choke valve, whereby the temperature of the supply of air entering said intake conduit will be prevented from becoming abnormally increased, and means connecting said throttle valve to said fuel valve operable after said throttle valve passes beyond half-open throttle position gradually to open said fuel valve.

37. In combination with an internal combustion engine having an intake conduit, a throttle valve in said conduit, means for supplying liquid fuel to said conduit, a valve for controlling said liquid fuel supply, a hot air supply influenced by the heat of the engine, a hot air inlet leading to said conduit, a choke valve in said hot air inlet, a cold air inlet to said conduit, a valve in said cold air inlet, a thermostatic device in said hot air inlet controlling said choke valve, means operatively connecting said cold air valve and said choke valve to permit the cold air valve to remain practically closed during the initial movement of said choke valve and to cause said cold air valve to open rapidly during another movement of said choke valve, whereby the temperature of the supply of air entering said intake conduit will be prevented from becoming abnormally increased, and means connecting said throttle valve to said fuel valve operable after said throttle valve passes beyond half-open throttle position gradually to open said fuel valve.

38. In combination with an internal combustion engine having an intake conduit, a throttle valve in said intake conduit, means for supplying a liquid fuel to said conduit, a valve controlling said fuel supply, a hot air supply influenced by the temperature of the engine, a hot air inlet to said conduit, a thermostatically controlled choke valve in said hot air inlet, a cold air inlet, a valve controlling said inlet, connections between said choke valve and said cold air valve and said throttle valve operable to vary the proportions of hot air, cold air and fuel in response to the running condition of the engine as jointly controlled by said thermostatic device and throttle valve.

39. In combination with an internal combustion engine having an intake conduit, a throttle valve in said intake conduit, means for supplying a liquid fuel to said conduit, a valve controlling said fuel supply, a hot air supply influenced by the temperature of the engine, a hot air inlet to said conduit, a thermostatically controlled choke valve in said hot air inlet, a cold air inlet, a valve controlling said inlet, connections between said choke valve and said cold air valve and said throttle valve operable to vary the proportions of hot air, cold air and fuel in response to the running condition of the engine as jointly controlled by said thermostatic device and throttle valve, and means to limit the movement of said hot air valve relatively to the movement of said throttle valve near its closed position.

40. In combination with an internal combustion engine having an intake conduit, a valve in said conduit, means for supplying liquid fuel to said conduit, an air inlet to said conduit, a balanced choke valve in said inlet, a thermosensitive coil having one end connected to said choke valve, and means connecting the other end of said coil to the valve in said conduit whereby the movement of the valve in said conduit varies the position of said choke valve.

41. In combination with an internal combustion engine having an intake conduit, a throttle valve in said conduit, a throttle lever adapted to control said throttle valve; means for supplying liquid fuel to said conduit; an air inlet to said conduit, a butterfly choke valve in said air inlet, a thermosensitive coil having one end connected to said choke valve, and means connecting the other end of said coil to said throttle lever operable by the movement of said throttle lever to vary the position of said choke valve.

42. In combination with an internal combustion engine having an intake conduit, a throttle valve in said conduit, a throttle lever and means for supplying liquid fuel to said conduit, a hot air inlet to said conduit, a chambered butterfly valve within said hot air inlet, a thermostatic device comprising a bi-metallic spiral coil enclosed within said valve chamber having one end connected to said choke valve, and means connecting the other end of said bi-metallic member to said throttle lever operable by the movement of said throttle lever to vary the position of said choke valve.

43. In combination with an internal combustion engine having an intake conduit, a throttle valve in said conduit, a throttle lever and means for supplying liquid fuel to said conduit, a hot air inlet to said conduit, a chambered butterfly valve within said hot air inlet, a thermostatic device comprising a bi-metallic spiral coil enclosed within said valve chamber having one end connected to said choke valve, and means connecting the other end of said bi-metallic member to said throttle lever operable by the movement of said throttle lever to vary the position of said choke valve, and means for limiting the movement of said choke valve relative to the movement of said throttle lever.

In testimony whereof, I have signed my name to this specification.

MERL R. WOLFARD.

of the valve in said conduit varies the position of said choke valve.

41. In combination with an internal combustion engine having an intake conduit, a throttle valve in said conduit, a throttle lever adapted to control said throttle valve; means for supplying liquid fuel to said conduit; an air inlet to said conduit, a butterfly choke valve in said air inlet, a thermosensitive coil having one end connected to said choke valve, and means connecting the other end of said coil to said throttle lever operable by the movement of said throttle lever to vary the position of said choke valve.

42. In combination with an internal combustion engine having an intake conduit, a throttle valve in said conduit, a throttle lever and means for supplying liquid fuel to said conduit, a hot air inlet to said conduit, a chambered butterfly valve within said hot air inlet, a thermostatic device comprising a bi-metallic spiral coil enclosed within said valve chamber having one end connected to said choke valve, and means connecting the other end of said bi-metallic member to said throttle lever operable by the movement of said throttle lever to vary the position of said choke valve.

43. In combination with an internal combustion engine having an intake conduit, a throttle valve in said conduit, a throttle lever and means for supplying liquid fuel to said conduit, a hot air inlet to said conduit, a chambered butterfly valve within said hot air inlet, a thermostatic device comprising a bi-metallic spiral coil enclosed within said valve chamber having one end connected to said choke valve, and means connecting the other end of said bi-metallic member to said throttle lever operable by the movement of said throttle lever to vary the position of said choke valve, and means for limiting the movement of said choke valve relative to the movement of said throttle lever.

In testimony whereof, I have signed my name to this specification.

MERL R. WOLFARD.

CERTIFICATE OF CORRECTION.

Patent No. 1,627,947.      Granted May 10, 1927, to

MERL R. WOLFARD

It is hereby certified that error appears in the printed specification of the above numbered patent requiring correction as follows: Page 9, line 87, claim 12, after the word "valve" insert the word "and"; page 10, line 69, claim 19, for the numeral 20 read "so"; and that the said Letters Patent should be read with these corrections therein that the same may conform to the record of the case in the Patent Office.

Signed and sealed this 14th day of June, A. D. 1927.

Seal.

M. J. Moore,
Acting Commissioner of Patents.

CERTIFICATE OF CORRECTION.

Patent No. 1,627,947.                             Granted May 10, 1927, to

MERL R. WOLFARD

It is hereby certified that error appears in the printed specification of the above numbered patent requiring correction as follows: Page 9, line 87, claim 12, after the word "valve" insert the word "and"; page 10, line 69, claim 19, for the numeral 20 read "so"; and that the said Letters Patent should be read with these corrections therein that the same may conform to the record of the case in the Patent Office.

Signed and sealed this 14th day of June, A. D. 1927.

Seal.

M. J. Moore,
Acting Commissioner of Patents.